(12) United States Patent
Karapetyan (10) Patent No.: US 9,549,638 B1
(45) Date of Patent: Jan. 24, 2017

(54) BBQ OVEN WITH CONTROLLABLE LEVEL POSITION OF CHARCOAL CHAMBER AND INSERTS

(71) Applicant: Armen Karapetyan, Los Angeles, CA (US)

(72) Inventor: Armen Karapetyan, Los Angeles, CA (US)

(*) Notice: Subject to any disclaimer, the term of this patent is extended or adjusted under 35 U.S.C. 154(b) by 50 days.

(21) Appl. No.: 14/545,479

(22) Filed: May 11, 2015

(51) Int. Cl.
*A47J 37/07* (2006.01)

(52) U.S. Cl.
CPC ......... *A47J 37/0731* (2013.01); *A47J 37/0763* (2013.01)

(58) Field of Classification Search
CPC .... A47J 37/07; A47J 27/0704; A47J 17/0731; A47J 37/0736; A47J 37/074; A47J 37/0763
USPC .. 126/9 R, 25 A, 25 AA, 25 B, 25 R, 152 A, 126/152 B, 154, 242–245; 431/345
See application file for complete search history.

(56) References Cited

U.S. PATENT DOCUMENTS

| | | | | |
|---|---|---|---|---|
| 4,281,633 A * | 8/1981 | Wackerman | ........ | A47J 37/0704 126/25 A |
| 4,365,613 A * | 12/1982 | Seki | ........ | A47J 37/06 126/154 |
| 5,154,159 A * | 10/1992 | Knafelc | ........ | A47J 37/0754 126/154 |
| 5,996,572 A * | 12/1999 | Ilagan | ........ | A47J 37/0786 126/21 A |
| 6,041,695 A * | 3/2000 | Kuopus | ........ | A47J 37/042 126/25 R |
| 6,708,601 B2 * | 3/2004 | Home | ........ | A23B 4/052 126/25 R |
| 7,637,258 B2 * | 12/2009 | Cosgrove | ........ | A47J 37/0754 126/25 R |
| 8,635,947 B2 * | 1/2014 | Karau | ........ | A47J 37/0704 126/17 |
| 8,875,622 B2 * | 11/2014 | Chung | ........ | A47J 37/0786 99/401 |
| 8,960,083 B2 * | 2/2015 | Wong | ........ | A47J 37/049 126/25 A |
| D724,886 S * | 3/2015 | Chung | ........ | D7/337 |
| 8,991,384 B2 * | 3/2015 | Choi | ........ | A47J 37/041 126/25 A |
| 2004/0154603 A1* | 8/2004 | Crawford | ........ | A47J 37/079 126/25 R |
| 2011/0203567 A1* | 8/2011 | Yeh | ........ | A47J 37/0704 126/25 A |
| 2013/0269675 A1* | 10/2013 | DeMars | ........ | A47J 37/0718 126/25 B |

* cited by examiner

*Primary Examiner* — William Gilbert (57) ABSTRACT

The present BBQ oven with controllable level position of charcoal chamber and inserts generally comprises a truncated spherical body including a thermometer and recesses for barbecuing food and/or insert holding rods in the upper portion of body, and the first necks (for control of the level position of the burning charcoal chamber, comprising a plate for charcoal), second neck (for an air flow control), sleeve and clamping member in the lower portion of the body.

8 Claims, 12 Drawing Sheets

BBQ OVEN WITH CONTROLLABLE LEVEL POSITION OF CHARCOAL CHAMBER AND INSERTS

FIELD OF THE INVENTION

The present invention relates to a barbecue (BBQ) oven and, more specifically, relates to a multifunction barbecue oven for grilling, roasting, hot pot cooking, etc. using charcoal and/or similar solid fuels.

BACKGROUND OF THE INVENTION

Barbecue is a favorite food of many people all over the world. The 90% of traditional barbecue ovens generally are of square configuration (U.S. Pat. No. 6,708,601; D724,886, etc.) or rectangular configuration (U.S. Pat. Nos. 8,635,947; 8,875,622; 8,991,384, etc.) (and includes a furnace compartment, an iron grid shelf set in an upper part of the BBQ's body and a fuel or charcoal chamber receptacle placed on a bottom of the BBQ's body. Food supported on the iron grid is grilled directly on burning charcoal. During barbecuing, oil secreted from food and some condiments will drop directly onto the burning charcoal, which would generate flames and heavy smoke and make the food burnt. The gravy stuck to the iron grid will be burnt and become soot carbon, which would become carcinogens upon contacting food. In addition, the existing barbecue ovens are generally disadvantageous in that they burn the barbecuing food and consume a plenty of charcoal, because the level position of the burning charcoal chamber with respect to the barbecuing food is permanent (fixed) and is uncontrollable, except the limited quantity of levels of the grid shelves.

It is also known, that currently 75-85% of barbeques sold are powered by gas and are of infinite variety in a crowded marketplace, the primary difference between most gas powered products is a geometric configuration of them, but they are still mostly made of the metal materials that does not lead to the expected food taste. Mostly, they are of a stainless steel appliance type design with side work surfaces and hinged top covers.

Some barbecue devices offer a complex burning system. For example, the assembly by U.S. Pat. No. 7,637,258 is an open "funnel shaped" inner burner inside an open top outer casing. The casings closed base has an central hole accommodating the burners small open bottom ash exit. The space between the inner burner wall and outer casing wall forms an annular air plenum that's supplied by an electric variable speed blower. Air enters the burner combustion space through perforations in the burner/plenum wall. This ensures rapid ignition and controls combustion rate (temp). This also precipitates ash from burner ash exit, through the ash chute and into storage container fitted to outer casings base. A radial diffuser centered on the heating surface provides a variable speed lateral air sheet between heating and grill surfaces, instantly blowing "Smoke and Flare-Ups" to the outer burner perimeter.

The device includes three main components. Through the "cut out" is seen the primary air supply duct intruding into the base of the outer casing, which encloses the inner burner to form a dual wall combustion chamber resulting in the formation of the annular air plenum. Also comprising an upper component, ash chute, mid component ash container, lower component. Projecting above the combustion chamber is the horizontal air diffuser, fitted onto the top of the air duct extension into a central air duct extending from the ash chute into inner burner. The flange fixed below the top of the central air duct locates the fire grate. The inner burner walls are perforated with holes allowing air to enter burner combustion space from air plenum space between outer casing wall and the inner burner wall. Primary air supplies air plenum through duct in base of the outer casing. The ash exit at the bottom of inner burner directs combustion ash into and through the ash chute, which is attached to the base of the combustion chamber. The ash then falls into the ash container, which removable fits to the ash chute bottom flange. The device also has a top flange and screw holes on the cylindrical body and radial supports which locate the central air duct. Below the top of the duct is located the flange which supports the fire grate. The secondary air supply flows through the supply duct, which intersects and conjoins with the vertical central air duct. The ash container's larger cylindrical body is located below the ash chute. The ash container includes a wide top flange, docking pin locator tube supported and positioned by the radials.

Such BBQ devices are extremely complex and expensive.

The known other BBQ devices are rotary barbecue devices. The rotary BBQ device by U.S. Pat. No. 8,991,384 wherein a completely combustible ceramic burner is used, the food is rotated to make rotation and revolution possible so that the food can periodically move close to the ceramic burner, the condition of the food approaching the ceramic burner rotates by 180° per revolution of rotating discs, and the rotating plate can be removed from the casing. The device includes a casing forming a body thereof and having an exhaust gas housing for collecting exhaust gas and an exhaust gas path connected to the exhaust gas housing to discharge the exhaust gas via an exhaust hole; a ceramic burner mounted at the upper side of the casing to radiate infrared rays towards the inside of the casing; two rotating discs; rotating members mounted to the corresponding rotation couplings of the two rotating discs; a driving unit connected to any one of the rotating discs to rotate one or more of the rotation couplings in the centers and the rotation couplings in the edges; and a moving unit connected to the rotating discs to move the rotating discs. The casing has a box shape in general, and it is formed in a two-layer structure of a cooking layer for cooking foods using heat and a storage layer for storage by heat insulation of cooked foods through the heat generated from the cooking layer. The casing forms the body of the barbecue device, and has an exhaust gas housing for collecting exhaust gas and an exhaust gas path connected to the exhaust gas housing to discharge exhaust gas via an exhaust gas outlet. The storage layer comprises the installed shelves for storing foods and a door through which the inside can be seen. The inside of the wall of the casing is made of stainless steel plate. The front door of a transparent material is installed in the front of the casing so as to watch the cooking process, and it is preferable that the material of the door is heat-resistant glass. On the top of the casing is installed a burner, on top of which there are an exhaust gas housing for collecting exhaust gas generated by combustion of the burner and an exhaust gas path connected to the exhaust gas housing, and the collected exhaust gas is discharged via the exhaust gas outlet. Around the exhaust gas path or the exhaust gas housing is installed a heat exchange jacket. As the heat-exchange medium circulating in the heat exchange jacket is heat-exchanged with exhaust gas, a considerable part of the heat of exhaust gas can be recovered to be utilized. As a heat-exchange medium, water may be used; it is introduced into a water inlet, and is discharged from the water outlet through the heat exchange jacket. A duct is arranged around the exhaust gas path or the exhaust gas housing. If air is blown into the duct through an intake port, air is heated by exhaust heat. At this time, by discharging hot air from the exhaust port, heat of exhaust gas can be recovered to be utilized. By using hot water and hot air obtained through the recovered heat of exhaust gas, the inside of the storage space or supply hot water can be heated. The exhaust gas path is made of a double structure of an inner tube and an outer tube. The inner tube is connected to the exhaust gas housing and the outer tube is connected to a ventilation duct. The ventilation duct sucks in air from the atmosphere and supplies it to the burner. The burner mounted at the upper side of the casing radiates infrared rays toward the inside thereof. The burner of a general type may be used for the ceramic burner. The burner includes a housing which is connected to a gas tube. The barrier blocks the gas supplied from the inside of the housing to help gas diffusion, and a cell-type base plate discharges gas.

Such rotary BBQ devices are complex and expensive too.

Another rotary BBQ device, described in the U.S. Pat. No. 6,041,695, is also intended to rotate the food during barbecuing. This device is an indirect heat barbecue oven and smoker which utilizes an elongate chamber for receiving combustibles so that smoke may be produced therein and wherein there is provided a rotating wheel with support arms, wherein each pair of support arms support an open mesh tray upon which foods or the like may be positioned and wherein the bottom of the oven forms a slanted floor of the oven and acts to receive and direct grease and fluids so that the same may be drained to the outside of the oven without contamination of the burners.

This BBQ device includes an enclosure, having an upper smoker and heat portion and a lower burner portion, and having a bottom floor which is somewhat inclined from the portion of the chamber furthest from the burners so that grease and other drippings that fall onto bottom floor are directed towards a drain or exit port which communicates to a lower grease receiving receptacle. The floor slopes towards the drain port which has a closure, but which may be open during the barbecuing process to allow grease and other fluids to accumulate on the bottom floor and allowed to be drained therefrom. Supported within the oven in the upper portion is rotatable wheel member comprising spaced and opposed support arms each carrying an open mesh tray in pivoted relationship so that the trays stay in the horizontal, level position during operation and when the wheel assembly rotates. Upright bracket of tray allows for attendant to support arm. Sleeve is provided for adjustment of trays. Wheel assembly is driven by external motor by means of pulley and chain mechanism to slowly rotate wheel assembly through 360°. The wheel assembly is positioned somewhat higher than the center of the upper oven portion so as to allow the trays carrying for example, meat and the like, to pass through a concentrated smoke and heat upper portion of oven portion. An elongate wood receiving chamber or compartment, having spaced apertures with outside door, is provided to receive wood by which smoke and the like is generated. Charring as opposed to full combustion is achieved by reason of the limited number of apertures provided to thereby control the amount of oxygen provided to wood contained within the compartment. The compartment has its forward end closest to the door opening lower than the reward section by about 15°, so that smoke generated by the slightly combustible wood within compartment moves rearwardly towards and into the back portion of barbecue oven. The wood smoke generating compartment comprises two parallel burners connected through suitable gas conduit, which has the usual gas controls and regulator by which gas being passed into the burners may be regulated. The front of barbecue oven is provided with an opening with hinged door so that access to the interior of oven may be obtained. Door is secured through the front portion of oven by a simple L-shaped latch member engaging flange provided around opening. The upper most portion of opening is below a line drawn therefrom to the lower most interior opening of vent, thereby allowing for an accumulation of heat and smoke in section of upper oven portion. The lower most portion of the vent is about ½ inch above the top of the opening which prevents smoke and heat bellowing out towards the operator. The arms of rotating member pivotally support each of the trays by simple bolt and nut mechanism. The elongate compartment for receiving wood has an opening exterior of the barbecue oven so that additional wood may be placed thereinto and a slot is provided at the exiting terminus of compartment so as to receive plate door suspended from a chain.

This device is a mobile device and need an electrical power supply for the motor and motor control/regulator.

The recent BBQ oven by U.S. Pat. No. 8,960,083, includes a main furnace, an auxiliary furnace arranged below the main furnace and a charcoal disc selectively placed on the bottom of the main furnace or the bottom of the auxiliary furnace. The top of the main furnace has an inclined tile roof shaped main furnace top portion with hinged left and right triangular side plates and a detachable connecting rod means. The furnace chamber can be covered by hinged front and rear covers. The handled fork can be inclined erected on top portion of the main furnace or inclined inserted into the interior of the main furnace chamber and the auxiliary furnace chamber for grilling or roasting in a hanging manner to avoid the food to contact the iron grid. The barbecue oven can be used for grilling, roasting, grilled and hot pot cooking and other function, and can be stored and carried conveniently. The main furnace comprises a bottom frame, a front wall, a left wall, a rear wall and a right wall erected from the bottom frame, to form a rectangular main furnace body with an open top and an open bottom. The interior of the main furnace body defines a main furnace chamber. A horizontally extending support bar is arranged on an inner surface of the front wall, and the distance of the support bar from a top edge of the front wall is approximately ⅓ of the height of the front wall. A horizontally extending support bar is also arranged on an inner surface of the rear wall, and the distance of the support bar from a top edge of the rear wall is approximately ⅓ of the height of the rear wall. A left triangular side panel and a right triangle side panel are pivotally connected respectively to the top edge of the left side wall and the top edge of the right side wall by hinges. The left triangle side panel and the right triangular side panel are pivotal about the hinges respectively between a downward position in which the left triangle side panel and the right triangular side panel lie on an outer surface of the left side wall and the right side wall respectively and an upward vertical position. The angle between a waist edge and a bottom edge of each of the triangle left side panel and the triangular right side panel is 35°–45°. On the inner surface of each triangle side panel, an inward recessed pocket-shaped socket is formed by means of stamping near a top position of each triangle side panel. A detachable connecting rod means is provided, which is comprised of a two-bar connector and inserters fixed to both ends of the former. When the left triangle side panel and the right triangular side panel are in its upward vertical position, the connecting rod means is inserted via its inserters into the pocket-shaped socket, and connected the left side panel integrally with the right side panel. The charcoal disc comprises a chassis with a plurality of vents provided therethrough. Two bars are provided on an upper surface of the chassis near its front and rear edges. When in use, the charcoal disc is placed on the bottom frame of the main furnace or on the support bars of the main furnace. The peripheral dimension of the charcoal disc is slightly smaller than that of the main furnace chamber of the main furnace.

This device does not provide any control of the air in the barbecuing area and/or heat.

Thus, there is a great need in the art for the improved BBQ oven with controllable level position of charcoal chamber and inserts, providing a tasty food in the convenient, effective and not expensive easy controllable barbecue device.

Object and Advantages of the Invention

Accordingly, several objects and advantages of the present invention are to provide convenient, effective and not expensive barbecue device.

It is further object of the invention to increase effectivity of the barbecue device.

It is still further object of the invention to increase a convenience for routine use of the barbecue device.

It is another object of the invention to provide an efficient control of the position (level) of charcoal chamber and inserts inside barbecuing device.

It is still another object of the invention to provide not complex and not expensive barbecue device.

Still, further objects and advantages will become apparent from a consideration of the ensuing description accompanying drawings.

DESCRIPTION OF THE DRAWING

In order that the invention and the manner in which it is to be performed may be more clearly understood, embodiments thereof will be described by way of example with reference to the attached drawings, of which:

FIGS. 12(*a*)-12(*f*) are the simplified drawings of the inserts.

SUMMARY OF THE INVENTION

In view of the foregoing disadvantages inherent in the known prior art, the present invention provides an improved BBQ oven with controllable level position of charcoal chamber and inserts eliminating the burn of barbecuing food. As such, the general purpose of the present invention, which will be described hereinafter in greater details, is to provide a new BBQ oven with controllable level position of charcoal chamber and inserts, which has many of the advantages of the BBQ devices mentioned heretofore and many novel features that result in the convenient and efficient food barbecuing, which is not anticipated, rendered obvious, suggested or even implied by any of prior art BBQ devices, either alone or in any combination thereof. To attain this, the present invention generally comprises a truncated spherical body including a thermometer and recesses for barbecuing food and/or insert holding rods in the upper portion of body, and the first neck (for control of the level position of the burning charcoal chamber, comprising a plate for charcoal), second neck (for an air flow control), sleeve and clamping member in the lower portion of the body.

DESCRIPTION OF THE PREFERRED EMBODIMENTS

With reference now to the drawings, and particularly to FIGS. 1-12(*f*) thereof, an improved BBQ oven with controllable level position of charcoal chamber and inserts. The terms "rod(s)", "insert(s)" hereinbelow solely and/or jointly accumulate the meaning, for instance, of the barbecuing food holding devices/members. Therefore, the use at least one of the terms does not exclude the other meanings for the used term, if otherwise not specified.

Figure 1:
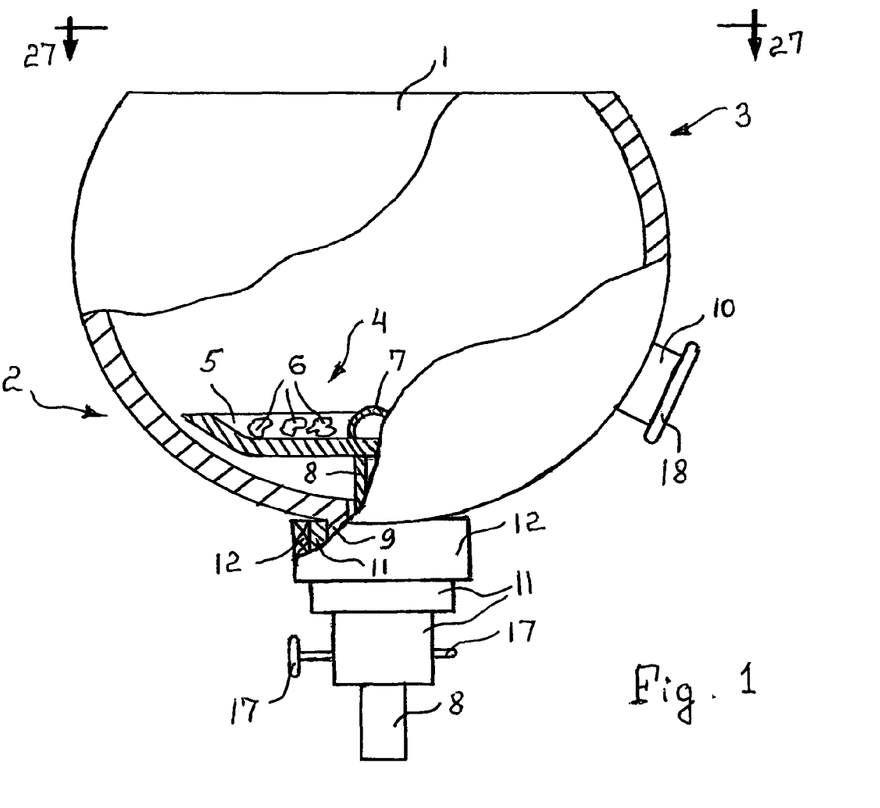
FIG. 1 is a simplified drawing of an improved BBQ oven with controllable level position of charcoal chamber and inserts.

In the FIG. 1 is shown the improved BBQ oven with controllable level position of charcoal chamber and inserts. The device comprises a truncated spherical body 1 (further maybe referred as to a body) including the lower portion 2 of the body 1, and upper portion 3 of the body 1.

The lower portion 2 includes a burning charcoal chamber 4 (further maybe referred as to a chamber), comprising a plate 5 for charcoal 6 (see also FIGS. 2, 3, 6, 9). The plate 5 includes the shackle 7 and cylindrical extension 8. Also, the lower portion 2 comprises: the first neck 9 (for control of the level position of the chamber 4) and second neck 10 (for air flow control).

Figure 2:
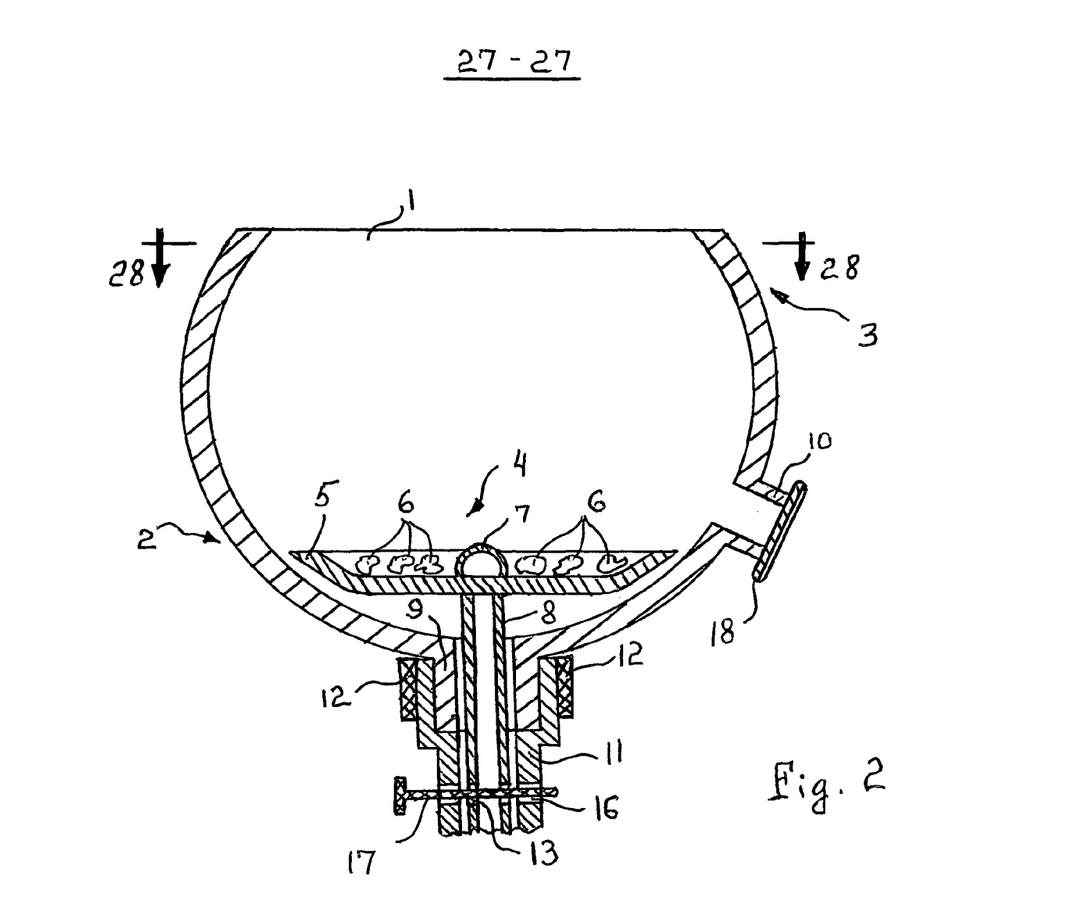
FIG. 2 is a simplified cross-sectional drawing 27-27 of an improved BBQ oven with controllable level position of charcoal chamber and inserts.
Figure 3:
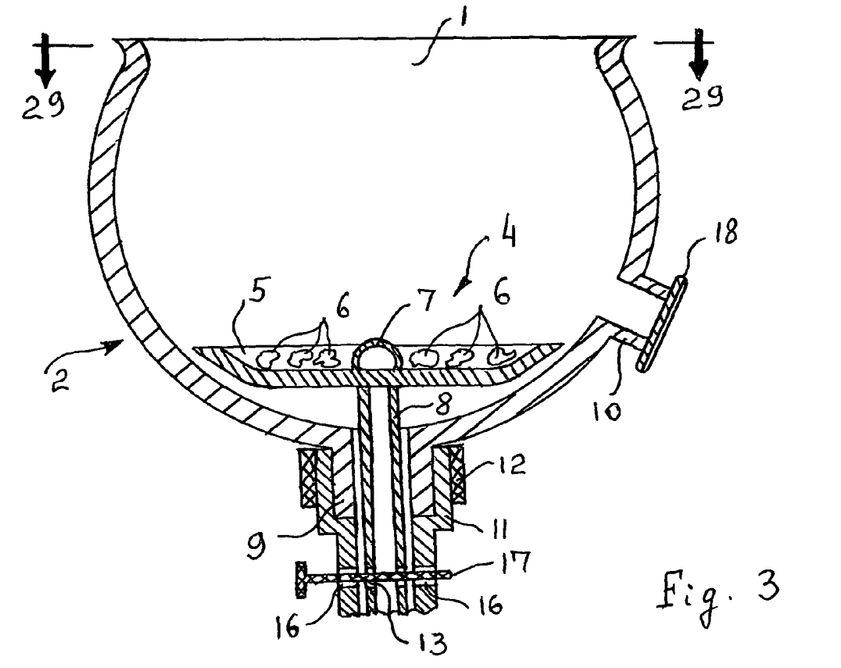
FIG. 3 is a simplified cross-sectional drawing of an improved BBQ oven with a squared top.
Figure 4:
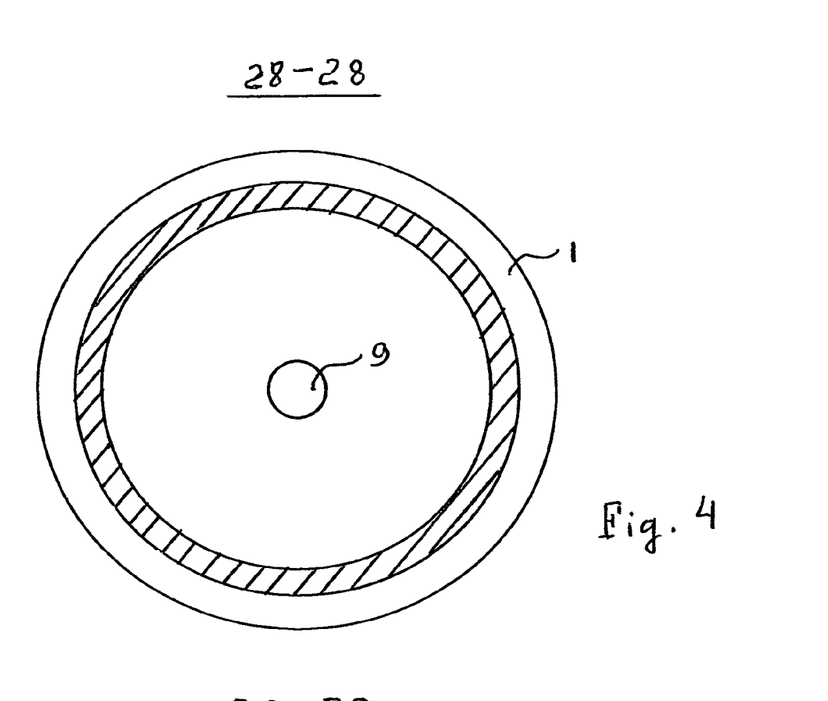
FIG. 4 is a simplified cross-sectional drawing 28-28 of an improved BBQ oven with a circular top.
Figure 5:
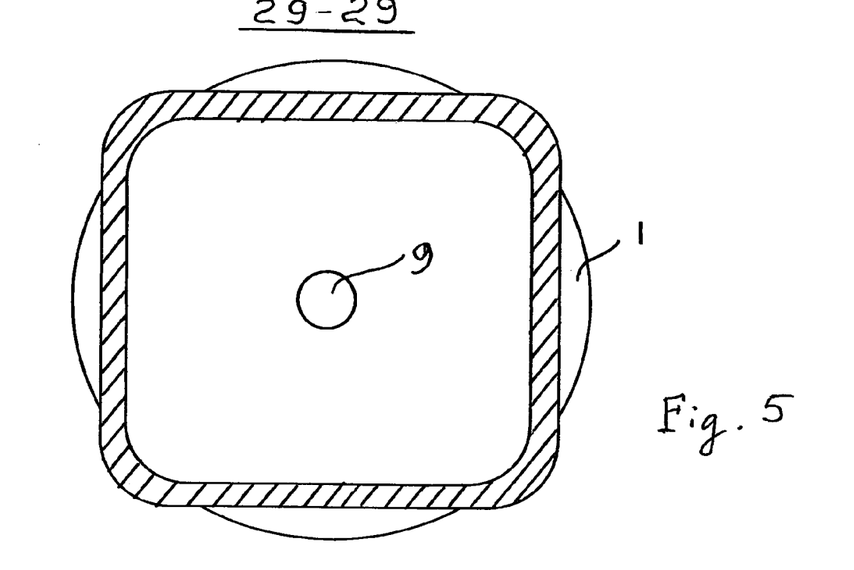
FIG. 5 is a simplified cross-sectional drawing 29-29 of an improved BBQ oven with a squared top.
Figure 6:
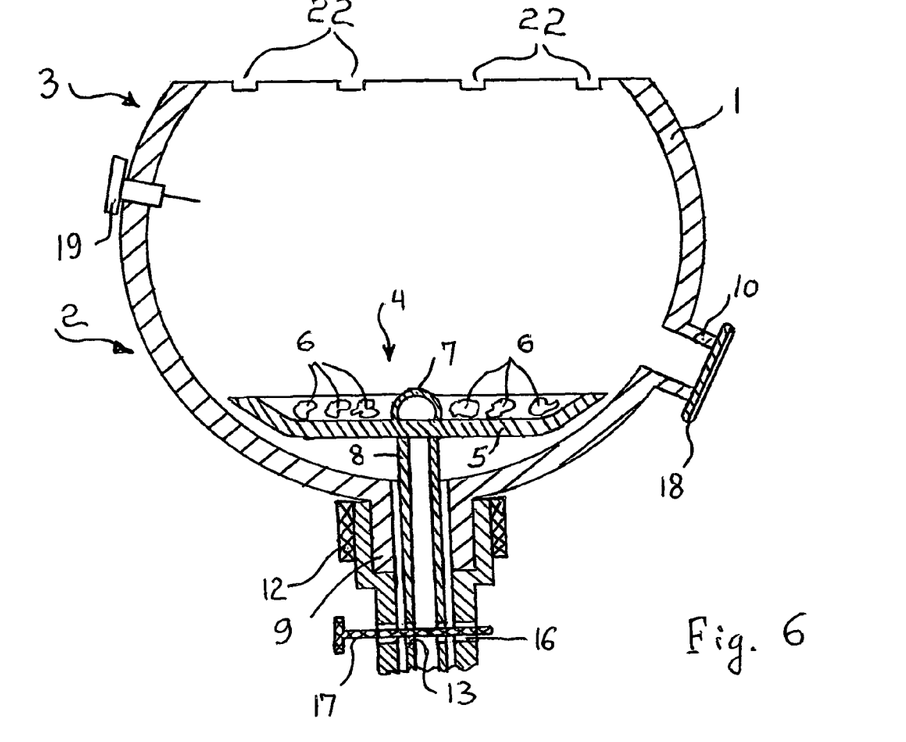
FIG. 6 is a simplified cross-sectional drawing of an improved BBQ oven with a thermometer and recesses.
Figure 7:
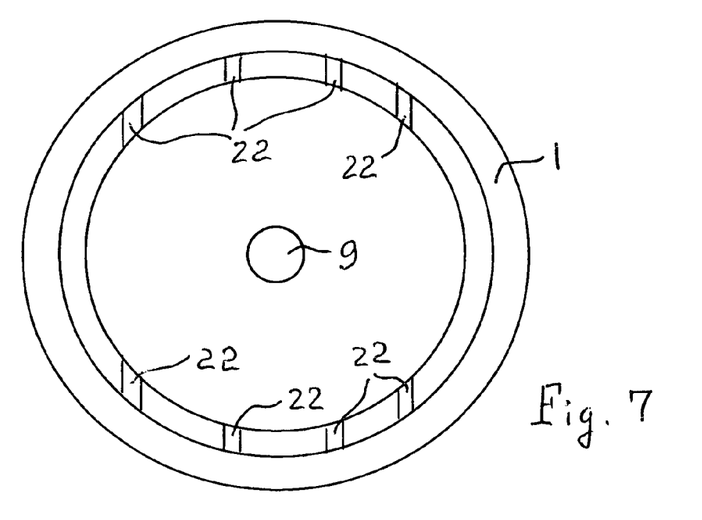
FIG. 7 is a simplified top view of a body with a circular top and recesses.
Figure 8:
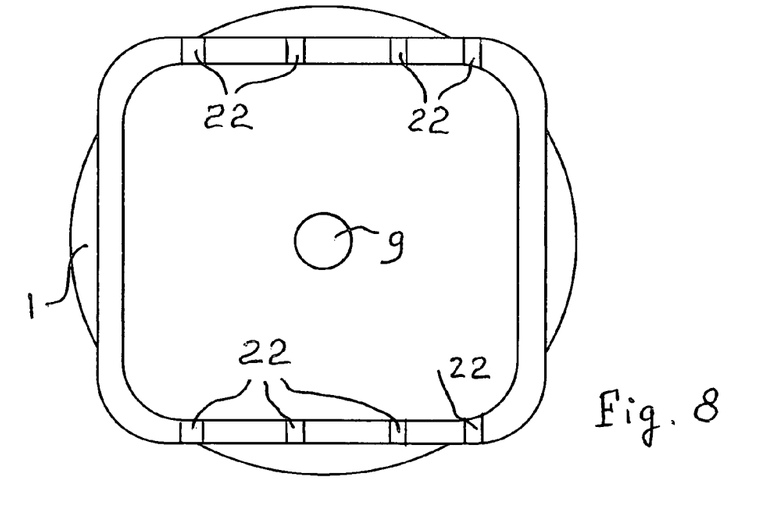
FIG. 8 is a simplified top view of an improved BBQ oven with a squared top and recesses.
Figure 9:
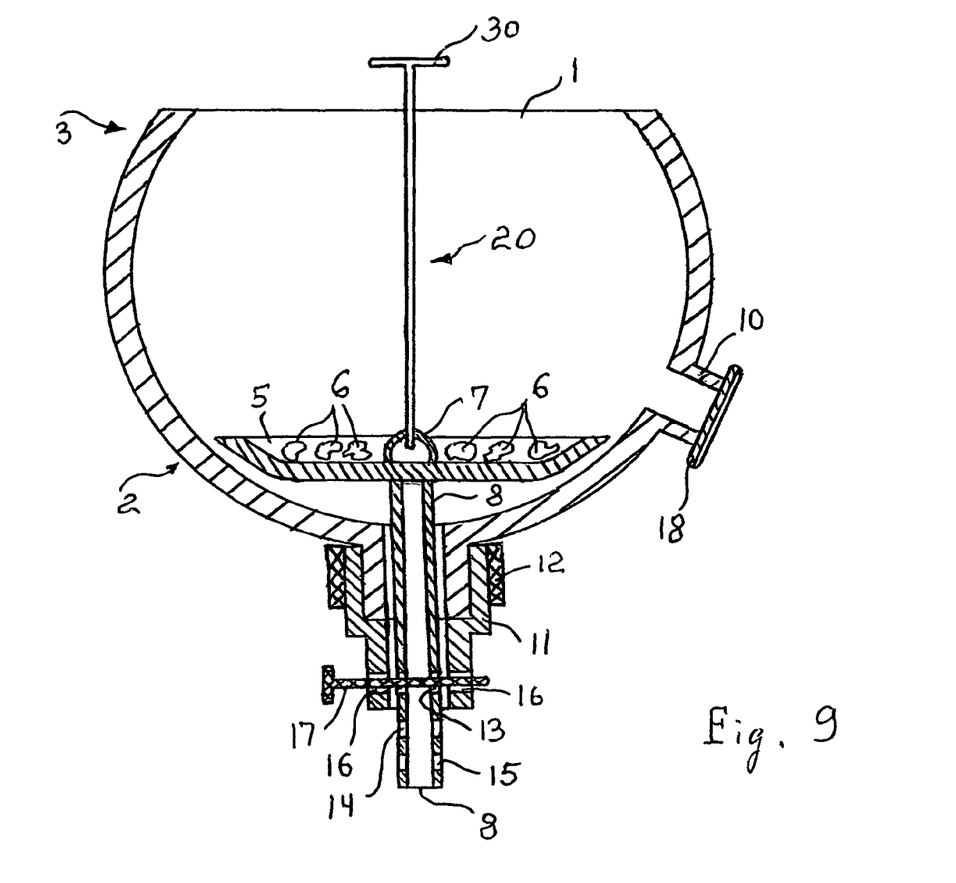
FIG. 9 is a simplified drawing of an improved BBQ oven with a lifting member.
Figure 10:
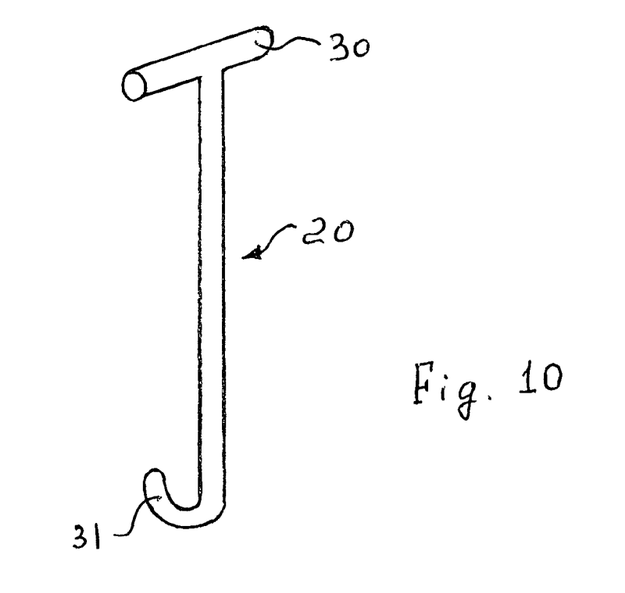
FIG. 10 is a simplified spatial view of the lifting member.
Figure 11:
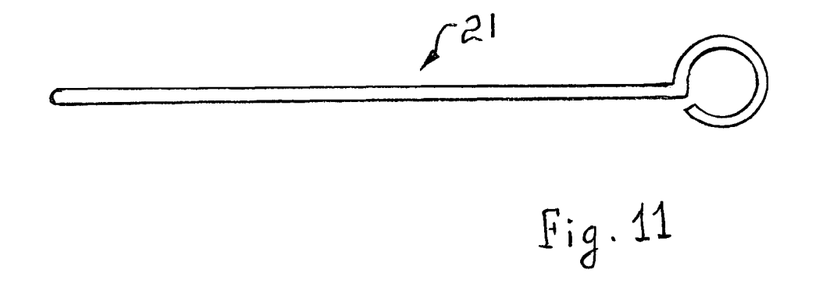
FIG. 11 is a simplified drawing of a barbecuing food or inserts holding rod.
Figures 12A, 12B:
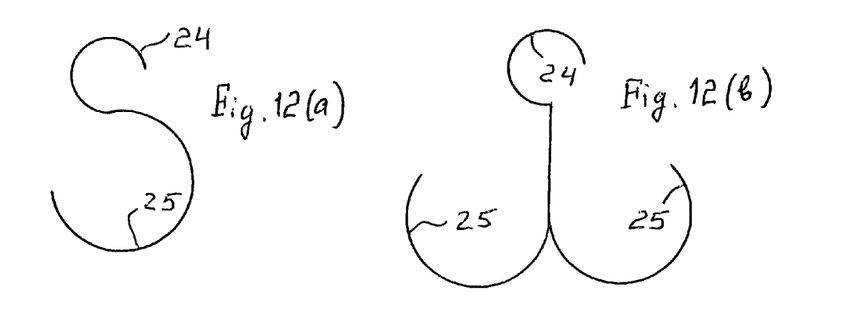
Figures 12C, 12D:
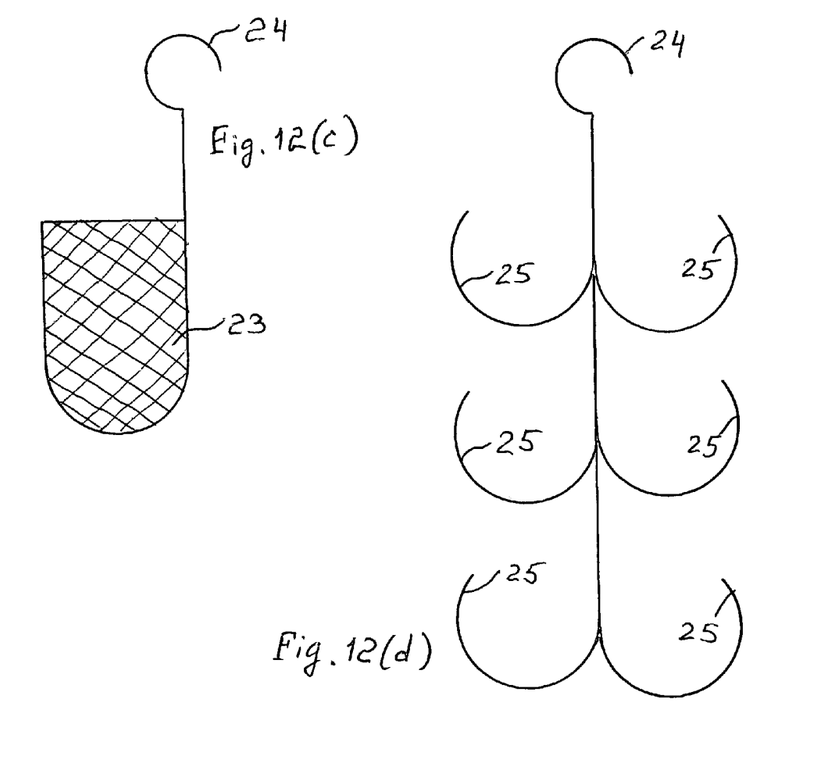
Figure 12E:
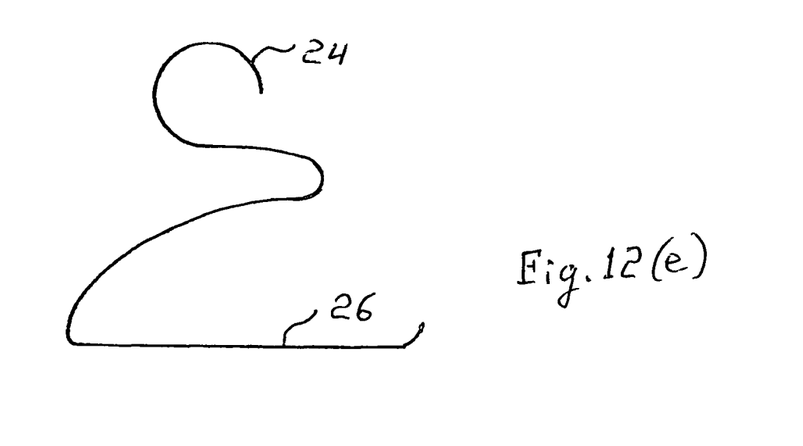
Figure 12F:
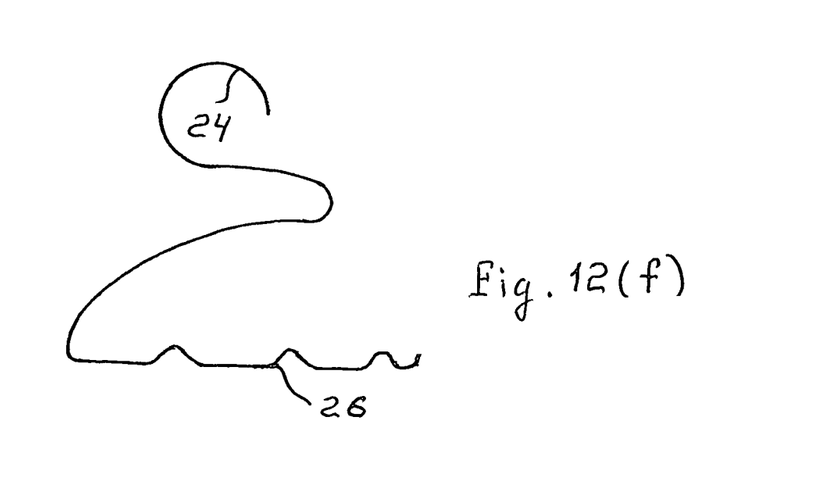

The BBQ oven also includes a sleeve 11 (FIGS. 1, 2, 6, 9) and a clamping member 12 (FIGS. 2, 6, 9). The cylindrical extension 8 includes the first aperture 13, second aperture 14 and third aperture 15 (FIG. 9), and the sleeve 11 includes aperture 16. The quantity of apertures in the cylindrical extension 8 is not limited to three, and can be at least two of any reasonable and convenient plurality of apertures. The level position of the plate 5 with the charcoal 6 is defined by the use of the different aperture (13 or 14 or 15) of the cylindrical extension 8. On FIGS. 2 and 6, is conditionally for simplification shown only one (first) aperture 13. The sleeve 11 is coupled with the first neck 9 by the clamping member 12. The clamping member 12 can be in the form of the hose clamp (not shown). The fixation of the level position of the burning charcoal chamber 4 is provided by a pin 17 passing through the aperture 16 of the sleeve 11 and through the one of the apertures (13 or 14 or 15) of the cylindrical extension 8. Any other principles of coupling of sleeve 11 with the first neck 9 can be used.

The second neck 10 is coupled with an air control member 18, which regulate the quantity of the air coming into the lower portion 2 of body 1. This air creates an optimal or desired charcoal burning condition and/or desirable temperature inside the body 1 of the improved barbecue oven. The control of the quantity of air passing into the body 1 can be provided by the control of at least one of the plurality of shutters (not shown) which can be open less or more (wider) by the operator of the improved BBQ oven. The temperature inside the body 1 can be measured by the thermometer 19 (FIG. 6) installed in the upper portion 3 of the body 1.

The different level position of the plate 5 of the burning charcoal chamber 4 can be provided from the bottom of the oven by lifting (or putting lower) the cylindrical extension 8 and fixing its position by the pin 17 inserted through the aperture 16 of the sleeve 11 and one of the apertures (13 or 14 or 15) of the cylindrical extension 8. The control of the level position of the burning charcoal chamber 4 may be provided from the top of the oven by lifting of the plate 5 by the lifting member 20 (FIG. 10), using the shackle 7 of the plate 5 and fixing the position of the burning charcoal chamber 4 by pin 17 and apertures 16 and one of 13-15. Also, the lifting member 20, comprising a handle 30 and a lifting hook 31 (FIG. 10), can be used for lifting plate 5 out of the body 1 for cleaning after barbecuing or insertion of new charcoal on the plate 5 into the body 1 for new barbecuing cycle.

The barbecuing food (not shown) can be inserted into body 1 for grilling in one of the following two general manner.

First, the food for grilling may be pierced by the barbecuing food and/or insert holding rod 21 (FIG. 11), and the holding rod 21 can be rested on one of the recesses 22 located on the top of the upper portion 3 (FIGS. 6, 7, 8), or may be hanged on the one of inserts, shown in FIGS. 12(*a*)-12(*f*). The inserts, used for the grilling, are not limited to the inserts (tool), shown in FIGS. 12(*a*), 12(*b*), 12(*d*)-12(*f*), and can be of any reasonable forms and geometric configurations, for example, it may be a metallic screen basket (not shown) hanged on the food holding rod 21 [e.g., the basket similar to the basket 23 in FIG. 12(*c*), but wider and having two hooks for hanging on the food holding rod 21 instead of one hook, as it is shown in FIG. 12(*c*)], etc. In FIG. 12(*a*) is shown a single insert including a hanging hook 24 and a single food hook 25, but the quantity of the food hooks (as well as the quantity of the hanging hooks) are not limited and can comprise the reasonable quantity of food hooks 25. For example, in FIG. 12(*b*) is shown an insert comprising two food hooks 25, and in FIG. 12(*d*) is shown an insert comprising six food hooks 25. The insert, shown in FIG. 12(*b*), is shown in the plane view and contain two hooks under 180° with respect to each other, but there can be three hooks (not shown) under 120°, or four hooks (not shown) under 90° with respect to each other. According to FIG. 12(*d*), the shown insert is depicted in the plane view too and contain two pair of three hooks under 180° with respect to each pair other, but there can be nine hooks (not shown) under 120°, to each pair other, or twelve hooks (not shown) under 90° with respect to each pair other. Also, the inserts, shown in FIGS. 12(*e*) and 12(*f*), intended for a few pieces of the food on food hangers 26, can be used for barbecuing. The inserts, shown in FIGS. 12(*a*)-12(*f*) can be coupled in cascade/sequence (not shown) to each other, providing different level of the barbecuing food inside body 1 (providing different height of the food from the plate 5 of the burning charcoal chamber 4).

Second, the barbecuing food can be placed in the traditional manner on the metallic shelf (not shown), rested on the top of the upper portion 3 (using or not using the recesses 22).

Additionally, the square configuration of the top (FIGS. 3, 5, 8) of the upper portion 3 [instead of circular form of the top (FIGS. 1, 2, 6, 4, 7, 9)] can be used in order to increase the area for food holding rods 21.

Any other suitable inserts or other style rods [for instance, a plane (flat) sticks (e.g., straight "sabre" style)] or shelves of any reasonable configuration can be used too.

The coupling/connection each other of the components (parts, portions, elements, members, etc.) of the improved BBQ oven can be provided by any other reasonable methods instead of clamping member, etc.

The configuration and/or geometrical forms of the components (parts, portions, elements, members, etc.) of the improved BBQ oven, are not limited to the configuration and/or geometrical forms depicted in the FIGS. 1-12(*f*), and can be of any reasonable configuration and form, for instance, of any other regular (not shown) or of any reasonable irregular form/shape (not shown).

It is understood, that any other reasonable coupling or necessary rigid connections (not shown) can be used too.

It is understandable, that the apertures 13-16 can be of any reasonable regular or irregular configuration and forms.

Figure 13:
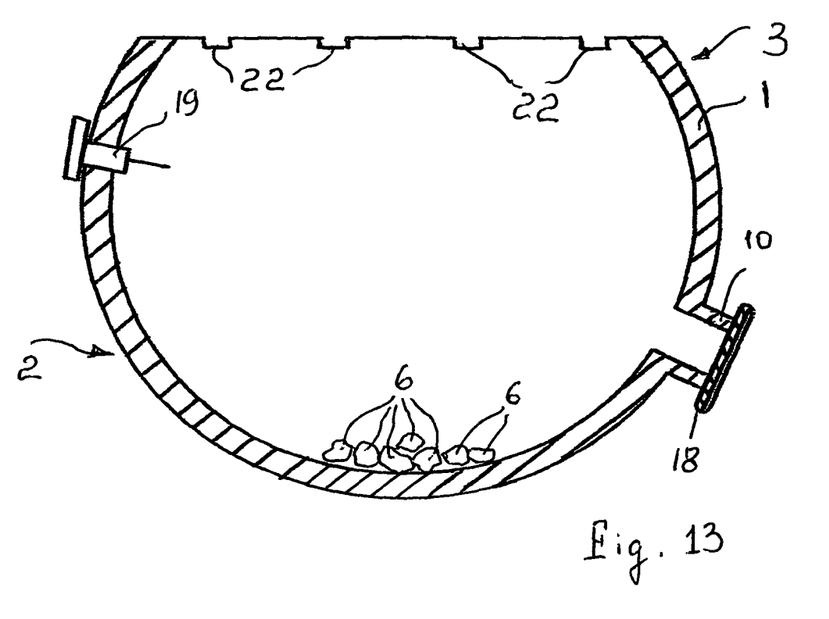
FIG. 13 is a simplified cross-sectional drawing of an improved BBQ oven of the solid truncated spherical configuration.

The body 1 can be manufactured from any suitably reasonable material, but the clay or ceramic, approved for use with respect to the food, is greatly preferable. The improved BBQ oven can comprise a lid (not shown). The burning charcoal chamber 4 and other appropriate members (component/parts, etc.) can be made of any reasonable heat/burning resistant material [e.g., metallic (stainless steel)], etc. Also, the body 1 of the improved BBQ oven can be of the solid truncated spherical form/configuration, with the body 1 comprising the neck 10 and thermometer 19 (without burning charcoal chamber 4 and without first neck 9), as shown in FIG. 13.

Figure 14:
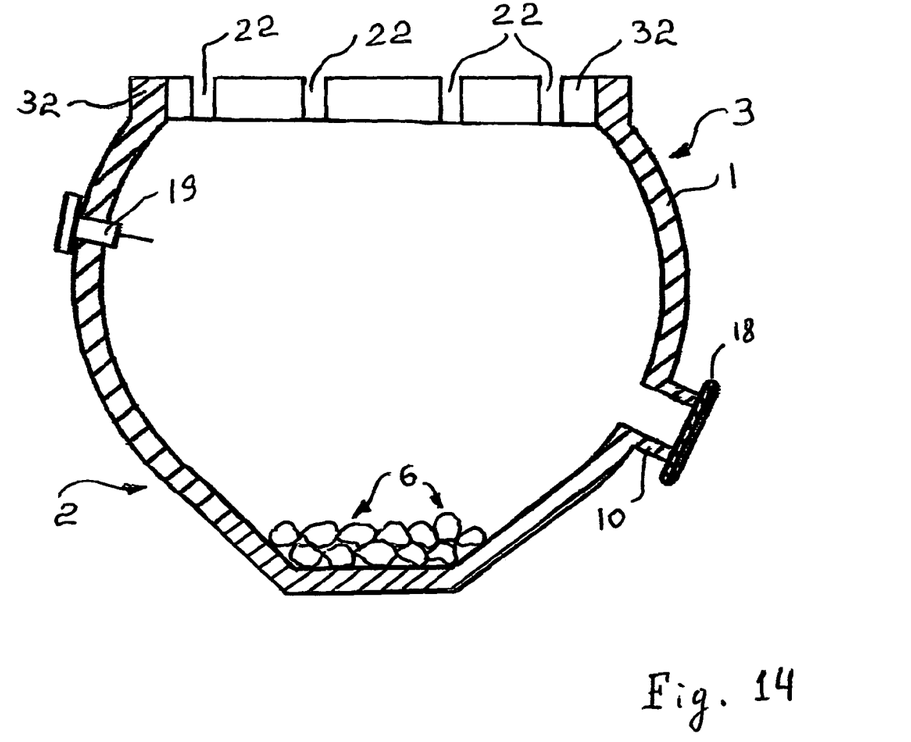
FIG. 14 is a simplified cross-sectional view of the other configurations of the top and bottom of an improved BBQ oven.

For convenience, the improved BBQ oven can comprise the handles (not shown) or can be installed on the stand (not shown) or cart (not shown) with the rolls/wheels (not shown), or can be rigidly connected (not shown) to the stand or cart. Also, for example, the bottom of the lower portion 2 can be of the flat configuration, as shown in FIG. 14, and the top of the upper portion 3 can include an additional rim 32, as shown in FIG. 14.

Generalizing, any and all modifications of the invention within the scope of the claims are possible.

CONCLUSION, RAMIFICATION AND SCOPE

Accordingly the reader will see that, according to the invention, an improved BBQ oven with controllable level position of charcoal chamber and inserts is provided. An improved BBQ oven with controllable level position of charcoal chamber and inserts has various possibilities, considering activities of the BBQ devices. While the above description contains many specificities, these should be not construed as limitations on the scope of the invention, but as exemplification of the presently-preferred embodiments thereof. An improved BBQ oven with controllable level position of charcoal chamber and inserts is universal and convenient for any barbecuing occasion.

Many other ramifications are possible within the teaching to the invention. For example, the device can be successfully used in the restaurants, etc.

Thus, the scope of the invention should be determined by the appended claims and their legal equivalents, and not by examples given.

There has thus been outlined, rather broadly, the more important features of the invention. In this respect, it is understood that the invention is not limited in its application to the details of arrangements of the components/portions/elements set forth in the description and/or drawings. The invention is capable of other embodiments and of being practiced and carried out in various ways. Also, it is to be understood that the phraseology and terminology employed herein are for the purpose of description and should not be regarded as limiting.

While the above description contains many specificities, these should not construed as limitations on the scope of the invention, but as exemplification of the presently-preferred embodiments thereof. Many other ramifications are possible within the teaching to the invention.

The persons of ordinary skills and/or creativity in the art will readily observe that numerous modifications and advantages of the improved device may be made while retaining the teachings of the invention.

As such, those skilled in the art will appreciate that the conception, upon which this disclosure is based, can readily be utilized as a basis for the designing of other structures, for carrying out the several purpose of the present invention. It is important, therefore, that the claims be regarded as including such equivalent constructions insofar as they do not depart from the spirit and scope of the present invention.

THE DRAWING REFERENCE NUMERALS

1—a truncated spherical body;
2—a lower portion of body 1;
3—an upper portion of body 1;
4—a burning charcoal chamber;
5—a plate;
6—a charcoal;
7—a shackle;
8—a cylindrical extension;
9—a first neck;
10—a second neck;
11—a sleeve;
12—a clamping member;
13—a first aperture of cylindrical extension 8;
14—a second aperture of cylindrical extension 8;
15—a third aperture of cylindrical extension 8;
16—an aperture of sleeve 11;
17—a pin;
18—an air control member;
19—a thermometer;
20—a lifting member;
21—a barbecuing food or insert holding rod;
22—a recess;
23—a basket;
24—a hanging hook;
25—a food hook;
26—a food hanger;
27-27—a cross-section;
28-28—a cross-section;
29-29—a cross-section;
30—a handle of the lifting member 20;
31—a hook of the lifting member 20;
32—a rim.

What is claimed is:

1. A BBQ oven having a plurality of inserts and controllable level position of a charcoal chamber, said BBQ oven comprising:
   a body of truncated spherical form including
      an upper portion comprising
         a thermometer installed in a wall of said body of said truncated spherical form;
         recesses located on a top of said upper portion of said body of said BBQ oven having said plurality of said inserts and said controllable level position of said charcoal chamber, wherein a barbecuing food or said inserts holding rod is rested on said recesses, and wherein each of said inserts includes a hanging hook and a food hook;
      a lower portion comprising
         a first neck located at a bottom of said lower portion of said body;
         a second neck located at said wall of said body, wherein said second neck is coupled with an air control member which includes at least one of a plurality of shutters;
      said charcoal chamber comprising
         a plate for charcoal, wherein said plate includes
            a shackle for lifting of said charcoal chamber by a lifting member comprising a handle and a hook;
            a cylindrical extension comprising at least two of a plurality of apertures;
         a sleeve coupled by a clamping member to said first neck of said lower portion of said body, wherein said sleeve includes an aperture through which a pin, passing through one of said at least two of said plurality of said apertures of said cylindrical extension, fixes said level position of said charcoal chamber inside said body of said BBQ oven having said plurality of said inserts and said controllable level position of said charcoal chamber.

2. The BBQ oven of claim 1, wherein said body of said truncated spherical form is further of a clay material.

3. The BBQ oven of claim 1, wherein said body of said truncated spherical form is further of a ceramic material.

4. The BBQ oven of claim 1, wherein said sleeve is further coupled with said first neck by a screw.

5. The BBQ oven of claim 1, wherein each of said inserts comprise a hanging hook and a food hook.

6. The BBQ oven of claim 5, wherein said each of said inserts further includes said hanging hook and a food hanger.

7. The BBQ oven of claim 1, wherein said top of said upper portion of said body of said BBQ oven is of circular form.

8. The BBQ oven of claim 7, wherein said top of said upper portion of said body of said BBQ oven is of square form.

* * * * *